(No Model.)

S. SHULL.
CAR COUPLING.

No. 389,771.  Patented Sept. 18, 1888.

Witnesses  
Jas. E. Hutchinson  
J. A. Rutherford

Inventor  
Samuel Shull  
By his Attorney  
James L. Norris.

UNITED STATES PATENT OFFICE.

SAMUEL SHULL, OF TOSTON, MONTANA TERRITORY, ASSIGNOR OF ONE-FOURTH TO WILLIAM N. DAVISON, OF SAME PLACE.

CAR-COUPLING.

SPECIFICATION forming part of Letters Patent No. 389,771, dated September 18, 1888.

Application filed February 16, 1888. Serial No. 264,238. (No model.)

*To all whom it may concern:*

Be it known that I, SAMUEL SHULL, a citizen of the United States, residing at Toston, in the county of Meagher and Territory of Montana, have invented new and useful Improvements in Car-Couplings, of which the following is a specification.

My invention relates to an automatic car-coupling comprising a pivoted vertically-acting hook, a link, and a dog to raise the pivoted hook and support it in the draw-head ready for engaging an entering link.

The invention consists in the construction and combination of devices hereinafter set forth, and illustrated in the accompanying drawings, in which—

Figure 1:
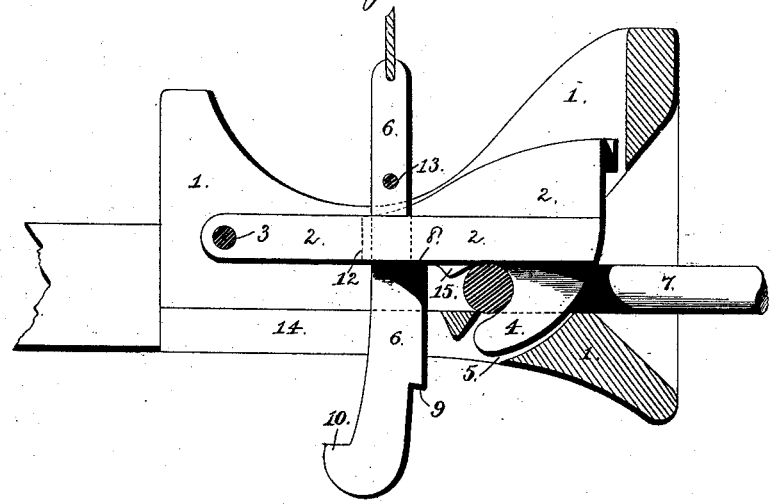
Figure 2:
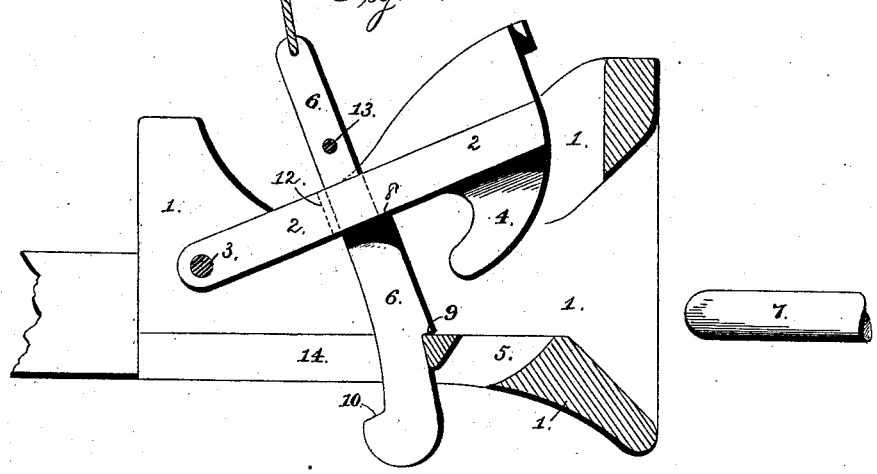
Figure 3:
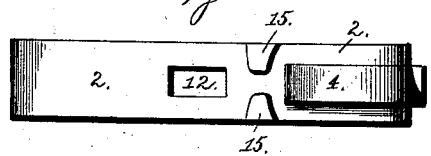

Figure 1 is a longitudinal section of my improved car-coupling, showing the hook and link engaged. Fig. 2 is a similar view showing the hook raised and supported by the dog ready for coupling. Fig. 3 is a bottom plan view of the hook.

Referring to the drawings, the numeral 1 designates a recessed draw-head, in which is pivoted a vertically-acting hook, 2, by means of a pin, 3, passed through the inner end of said hook. When the hook is in a lowered or horizontal position, its point 4 enters a recess or opening, 5, in the lower wall of the draw-head, and it will be seen that the hook is so arranged in the draw-head as to have a firm bearing at its forward end, whereby the hook is relieved from strain and liability of breakage under the draft of the link. It will also be seen that the forward or outer face of the hook is curved downward and backward in such a manner that the hook is made capable of rising under the pressure of an entering link; but I prefer to raise the link by means of a dog, 6, so constructed and arranged that it will support the raised hook in position to engage the link 7 when the latter enters the draw-head and pushes the dog back.

The dog 6 consists of a bar having shoulders 8 and 9 on its front edge and a shoulder, 10, on its rear edge. The upper end of the dog 6 is passed through a slot or mortise, 12, in the shank of the hook until the upper shoulder, 8, is in contact with the under side of the hook, and then a pin, 13, is passed through the dog immediately above the hook. This pin 13 prevents the dog from dropping and becoming detached from the hook. In the bottom of the draw-head is a slot, 14, through which the lower portion of the dog 6 passes. The lower shoulder, 9, on the front edge of the dog is adapted to engage the bottom wall of the draw-head in front of the slot 14 and so support the hook when raised, and the shoulder 10 on the rear edge of the dog forms a stop to limit the upward movement of the hook by coming in contact with the under side of the draw-head if the dog is raised too high.

To the upper end of the dog 6 may be attached a cord, chain, or rod, by which it can be elevated from the top of a car, or the dog may be connected with levers arranged to be operated from the side of the car.

When the dog and hook are elevated and supported in the draw-head, the entering link will strike against and trip the dog, thereby causing the hook to fall and engage the link. By raising the dog and hook the link can be disengaged. In order to render the engaged link self-centering and hold it properly in place, shoulders 15 may be formed in the sides of the coupling-hook, if desired.

It will be seen that the pivoted hook, whether resting horizontally in the draw-head or elevated and supported by the dog, will automatically engage any ordinary link.

What I claim as my invention is—

1. In a car coupling, the combination of a recessed draw-head, a slotted or mortised coupling-hook pivoted in the draw-head, and a dog passed vertically through the slot in the coupling-hook and having shoulders, whereby it is adapted to raise and support said hook, substantially as described.

2. In a car-coupling, the combination of a recessed draw-head having slot 14, the coupling-hook 2, pivoted in the draw-head and having a slot, 12, and shoulders 15, the dog 6, having shoulders 8 9 10 and pin 13, and the link 7, substantially as described.

In testimony whereof I affix my signature in presence of two witnesses.

SAMUEL SHULL.

Witnesses:
W. L. AUSTIN,
L. A. OSBORNE.